Feb. 23, 1932.　　　G. J. V. GUERIN　　　1,846,591

ARRANGEMENT FOR FIXING MONOGRAMS OR DECORATIVE DESIGNS ON BOX COVERS

Filed Feb. 28, 1931

G. J. V. Guerin
INVENTOR

By: Marks &Clerk
Attys.

Patented Feb. 23, 1932

1,846,591

UNITED STATES PATENT OFFICE

GEORGES JOSEPH VALENTIN GUÉRIN, OF ASNIÈRES, FRANCE

ARRANGEMENT FOR FIXING MONOGRAMS OR DECORATIVE DESIGNS ON BOX COVERS

Application filed February 28, 1931, Serial No. 519,158, and in France March 1, 1930.

The present invention relates to an arrangement for monogram or decorative designs on vanity cases, cigarette cases, work boxes or other similar articles.

The invention has for its object to devise an arrangement, whereby the monogram or the like may be readily attached on a box cover by the retailer and also readily dismounted if the monogram does not suit the wishes of the customer, whereas it may be permanently locked in place, without the use of auxiliary tools or ingredients when the desired monogram has been finally selected.

A preferred embodiment of my invention will be hereinafter described with reference to the appended drawings, given merely by way of example, and in which.

Figure 1:
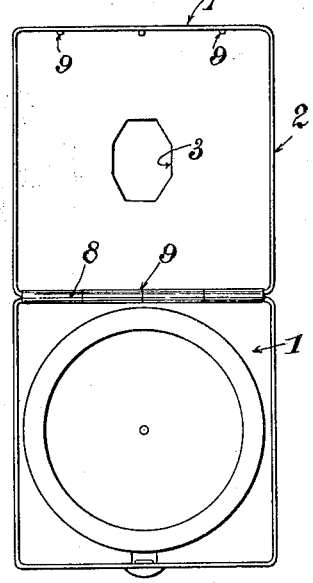
Fig. 1 is a plan view of a vanity case according to my invention, the case being shown open and with the false bottom of the lid removed.
Figure 2:
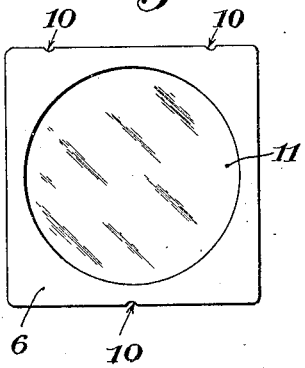
Fig. 2 is a view of the false bottom of the lid.
Figure 4:
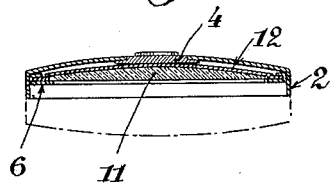
Fig. 4 is a sectional view of the lid, the monogram being fixed in its place as well as the false bottom.

According to the embodiment represented, the vanity case of the usual type comprises a receptacle 1, containing the powder and provided with a hinged lid 2. In this lid is made an opening 3 of any given shape, octagonal in the given example. This opening 3 may be disposed on any part of the lid. Preferably, the lid 2 should be slightly bulging and opening 3 should be placed in the middle thereof (Figs. 1 and 4).

Figure 3:
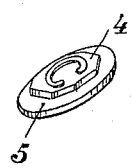
Fig. 3 is a perspective view of the monogram.

The monogram is carried by a piece 4 (Fig. 3) having the shape and size of opening 3, the base of this piece being provided with an edge which can be applied against the lid from the inside. The monogram is fixed to the piece 4 or else obtained by raised or hollowed engraving in the piece, or in any other way. Obviously, the monogram may be made of any suitable material: precious metal, precious stone, etc.

A plate 6 forced into the lid 2 and forming a false bottom, makes it possible to hold piece 4 in place. As long as the monogram is not placed on the lid, the piece 4 must not be fixed, so that it can easily be removed in order to place the monogram in its position.

For this purpose, the opposite edges 7 and 8 of lid 2 are provided with small inward projections 9 obtained, for example, by stamping, these projections 9 being differently placed on the two edges. Plate 6 is provided with notches 10 on the sides corresponding to the edges 7 and 8 of the lid, so that the notches are placed exactly opposite the projections 9 when the plate 6 is fixed in the lid. It is thus quite easy to remove plate 6 which is not held on the inside of the lid 2. Monogram 5 is then inserted in opening 3 and the plate is introduced into the lid 2 after being turned through an angle of 180 degrees from its first position, so that projections 9, which are differently placed on the opposite edges 7 and 8 of the lid, are no longer disposed opposite the notches 10 of plate 6. It is then necessary to press on plate 6 to force it into the lid, where it is held by the projections 9.

On the plate 6 is preferably mounted a mirror 11. This mirror is fixed by any given means; it may be, for example, maintained between plate 6 and another plate 12, the edges of one of the plates being bent over the other.

While I have disclosed what I deem to be the preferred form of my device I do not wish to be limited thereto as there might be changes made in the construction, disposition and form of the parts without departing from the spirit of my invention as comprehended within the scope of the appended claim.

What I claim is:

In a box, a lid provided with a hole, a monogram or decorative design projecting from a thin flat base, said monogram being adapted to fit in said hole, a yielding plate adapted to fit against the inner side of the lid, so as to apply said thin flat base against said inner side, said plate being provided with notches, projections on the inner walls of the lid, said notches and projections being so disposed on opposite sides of the lid that said notches and projections register with each other for one position of said plate within said lid and do not register for another position of said plate within said lid, whereby said plate may be removably fitted into said lid in said first position or may be permanently locked in place by forcing the same beyond said projections toward said lid in said second position.

In testimony whereof I have signed my name to this specification.

GEORGES JOSEPH VALENTIN GUÉRIN.